(12) United States Patent
Reiners

(10) Patent No.: US 6,942,088 B1
(45) Date of Patent: Sep. 13, 2005

(54) CONVEYOR SYSTEM FOR TRANSPORT OF EMPTY LUGGAGE CARTS FROM REMOTE LOADING STATIONS TO MULTI-LANE RETRIEVAL STATIONS AND METHOD

(75) Inventor: Herbert Reiners, Ennepetal (DE)

(73) Assignee: Intellect Ltd., Tortola (VG)

( * ) Notice: Subject to any disclaimer, the term of this patent is extended or adjusted under 35 U.S.C. 154(b) by 49 days.

(21) Appl. No.: 10/365,566

(22) Filed: Feb. 12, 2003

Related U.S. Application Data (60) Provisional application No. 60/356,722, filed on Dec. 13, 2002.

(51) Int. Cl.[7] .................................................. B65G 37/00
(52) U.S. Cl. ........................ 198/465.1; 198/321; 186/27; 186/58; 104/172.2; 104/172.3
(58) Field of Search ............................... 198/321, 465.1; 186/27, 58; 104/172.2, 172.3

(56) References Cited

U.S. PATENT DOCUMENTS

| | | | |
|---|---|---|---|
| 3,194,377 A | | 7/1965 | Fischbach et al. |
| 3,978,959 A | | 9/1976 | Muellner |
| 4,144,818 A | * | 3/1979 | Fletcher .................... 104/172.3 |
| 4,206,708 A | | 6/1980 | Behle |
| 4,411,354 A | * | 10/1983 | Thibault et al. .......... 198/465.1 |
| 4,518,072 A | | 5/1985 | Muellner et al. |
| 4,924,777 A | * | 5/1990 | Linton et al. ............. 104/172.2 |
| 4,972,936 A | * | 11/1990 | Kura ........................ 198/465.1 |
| 5,360,094 A | | 11/1994 | Adams et al. |
| 6,138,815 A | | 10/2000 | Reiners et al. |

* cited by examiner

Primary Examiner—Joseph Valenza
(74) Attorney, Agent, or Firm—Schweitzer Cornman Gross & Bondell LLP (57) ABSTRACT

A system and method for returning empty luggage carts over long distances from a remote collecting station to a retrieval station in a passenger terminal, where they may be retrieved by arriving passengers for the transportation of their luggage to parking lots, cab and bus loading areas, etc. A plurality of carts are inserted in nested arrangement into a load-in station. The carts are engaged individually, separated from the nested arrangement, and transported individually, in spaced-apart relation along a series of transport conveyor sections, changing elevations as appropriate and extending around curves as required to reach a discharge and retrieval station near the terminal luggage discharge area. At the retrieval end of the system, the individual, returning carts are deposited upon a shuttle carrier and shifted laterally into alignment with one of a plurality of storage tracks arranged in laterally spaced apart relation, collectively providing the capacity to receive and store a large number of returned carts, awaiting their eventual use by arriving passengers.

4 Claims, 7 Drawing Sheets

CONVEYOR SYSTEM FOR TRANSPORT OF EMPTY LUGGAGE CARTS FROM REMOTE LOADING STATIONS TO MULTI-LANE RETRIEVAL STATIONS AND METHOD

RELATED APPLICATION

This application is related to and claims the priority of Provisional Application Ser. No. 60/356,722, filed Feb. 13, 2002.

BACKGROUND AND SUMMARY OF THE INVENTION

Luggage carts for arriving passengers have become a fixture at airports and other passenger terminals around the world, enabling passengers to load and transport luggage on carts to parking lots or curbside bus stops or taxi stands. The carts are abandoned after use. Typically, the abandoned carts are gathered by hand and returned to retrieval locations proximate to the "baggage" claim area for reuse by arriving passengers.

There have been efforts to semi-automate the transport of empty carts from departure areas, drop-off areas and pick-up areas (i.e. curb sites) to baggage claim areas over comparatively short distances. Such systems have employed a single straight line conveyor to move nested carts from a feeder station, in a departure area, to a retrieval station, at a baggage claim or other area where empty carts are stored in a single file for access by passengers requiring carts.

Systems for moving small numbers of carts over short distances in straight line paths for single file storage are shown in U.S. Pat. Nos. 4,518,072 and 5,360,094. However, there is a need for apparatus for more efficiently handling and moving large numbers of carts over comparatively long distances and in other than straight-line paths, that is, paths with one or more curved portions.

The present invention provides a new and improved conveyor railway system and method for the efficient transport of empty luggage carts over long distances and for the distribution of the carts into parallel ranks of carts for reuse by luggage-bearing travelers.

The new system employs a series of straight and curved rail modular conveyorized sections, which may be assembled as required to form a railway path from a remote location such as a parking lot to a retrieval station where travelers can readily access the carts to transport their luggage. As an important aspect of the invention, the cart railway has a cart separator which separates and spaces ganged carts manually placed in a loading or collecting station at the head of the conveyor path and a shuttle dispenser, at the foot of the path, which accepts returning carts and distributes them in parallel ranks in the retrieval station.

For a more complete understanding of the invention and a better appreciation of its attendant advantages, reference should be made to the accompanying drawings and the following detailed description.

DETAILED DESCRIPTION OF THE PRESENT INVENTION

The luggage cart conveyor system and method of the present invention is adapted for usage with luggage carts of the type having fixed widely spaced rear wheels, which may be braked or unbraked, and forward wheels adapted to pivot for steering, the forward wheels being disposed in closely spaced pairs inwardly of the laterally spaced rear wheels and straddling the central longitudinal axis of the baggage cart. Alternatively, a single front wheel may be used, being disposed on the longitudinal center line of the cart. These types of luggage carts are well known to the luggage handling art and are illustrated, for example, in U.S. Pat. No. 6,138,815 to Herbert Reiners et al. ('815 patent), the disclosure of which is incorporated by reference. The aforementioned '815 patent is directed to a conveyor system for moving load carrying carts upwardly or downwardly along an incline between two levels.

The present invention is directed generally to a system and method for moving empty luggage carts along a path between a collecting station in a remote location and a cart retrieval station where the carts may be picked up and used by passengers for moving their luggage, typically from a passenger terminal baggage claim area to a departure area such as a parking lot or taxi stand.

Figure 1:
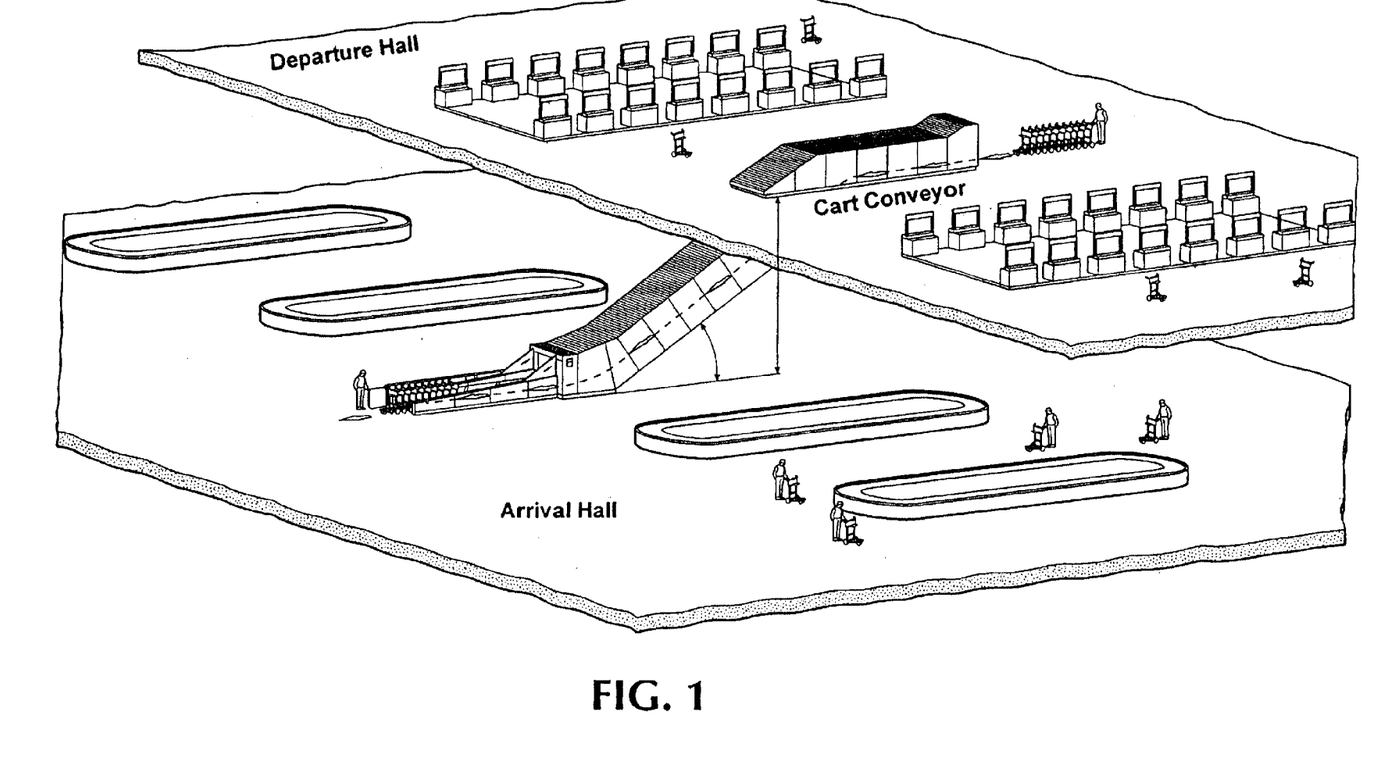
FIG. 1 is a schematic perspective of a simple one-way, straight-line cart or baggage cart conveyor system for moving carts from an upper level to a lower level.

With reference to FIG. 1, the known luggage cart conveyor system entails the usage of inclined cart conveyor apparatus, which may be of the type shown in the '815 patent, for engaging an empty cart and moving it downwardly between an upper departure floor level and a lower arrival hall level where the descended carts are nested or ganged together for retrieval and re-usage by arriving passengers claiming their baggage at a baggage claim area.

The new and improved conveyor system of the present invention is adapted for moving recovered empty carts over substantially long distances in airports and other passenger terminals and over paths which are not necessarily indoors nor in a straight-line path to the cart retrieval areas. The retrieved carts are stacked and stored in multiple parallel lanes for redistribution to newly arriving passengers requiring carts.

In accordance with the principles of the invention, the path of return of an empty cart need not be straight, nor on a single level. The path may go from an upper level to a lower level in the course of the return of the cart to the retrieval system, or it may go from a lower level to an upper level as the particular architecture and logistics of an airport terminal may dictate.

Figure 2:
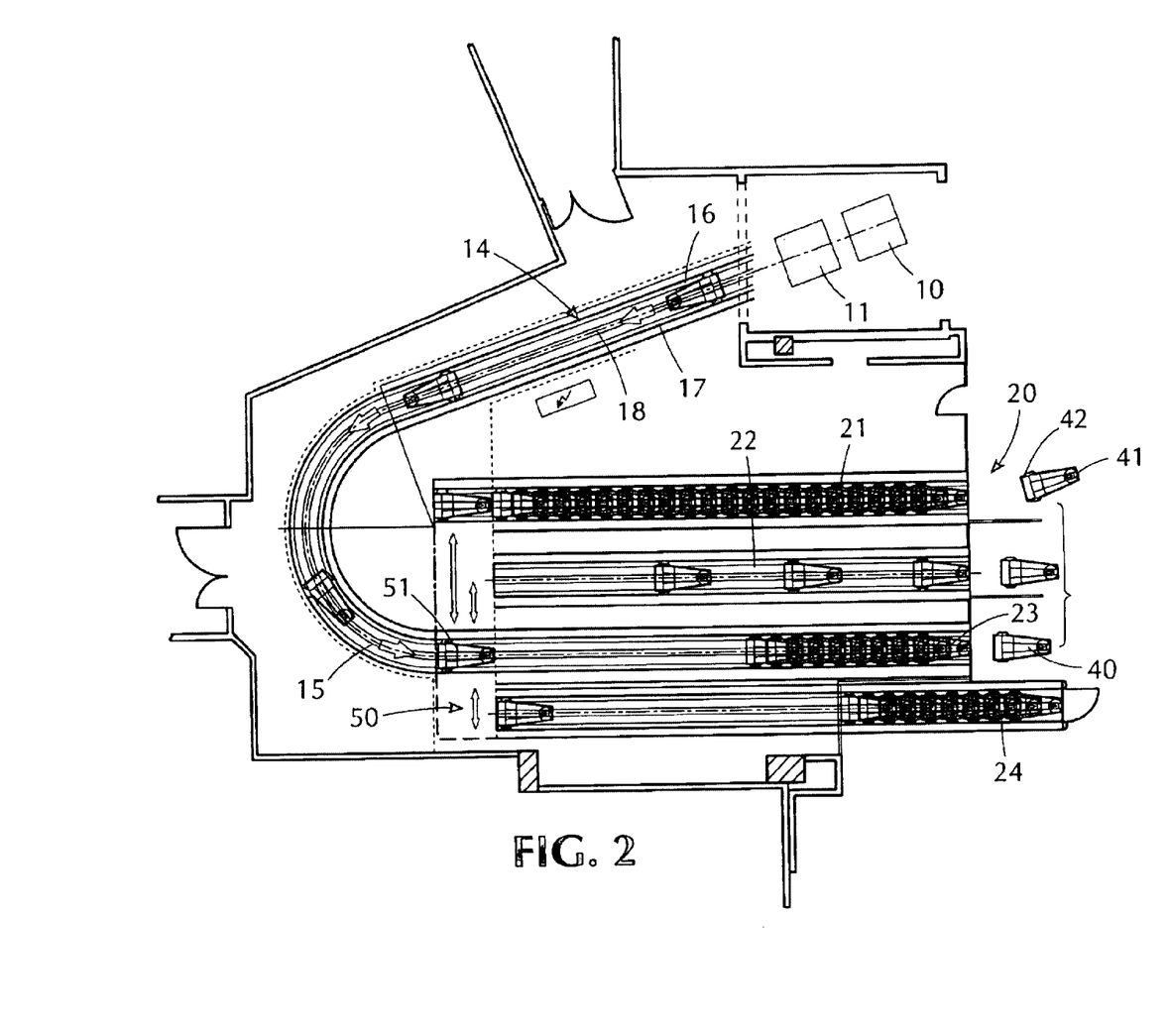
FIG. 2 is a partial plan view of a new one-way conveyor system for delivering a series of carts in a spaced relation from a collecting station through a path with a curved portion to a multi-lane cart retrieval station.

By way of an example, reference should be made to FIG. 2 where the final course of an extended return system for luggage carts is shown. In the system illustrated in FIG. 2, the carts are transported at an efficient speed of for example, at least 0.4 meters per second (80 ft./min) from a remote collecting station location which could be hundreds or even thousands of feet from the destination at the retrieval station. A large number of luggage carts per hour may be conveyed through the system.

Figure 3:
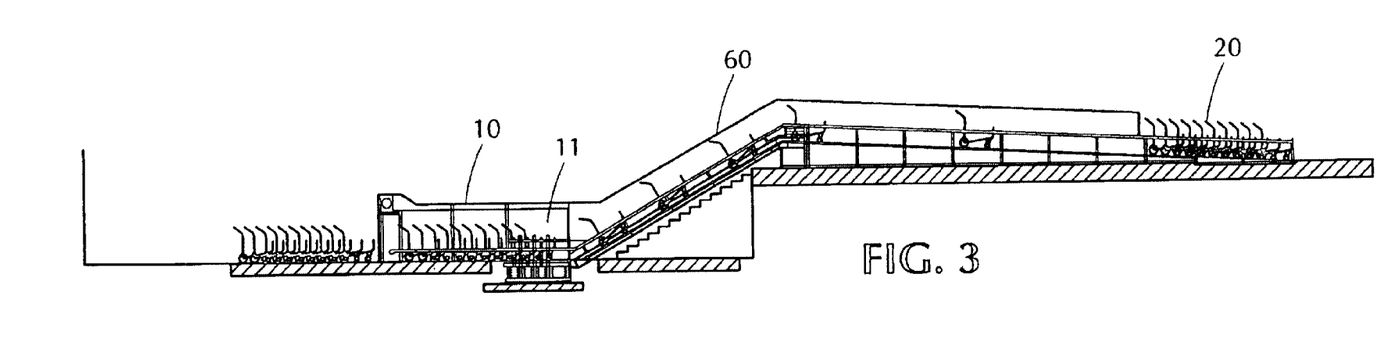
FIG. 3 is a side elevational view of a covered straight-line conveyer system for moving carts from a lower level to an upper level.
Figure 5:
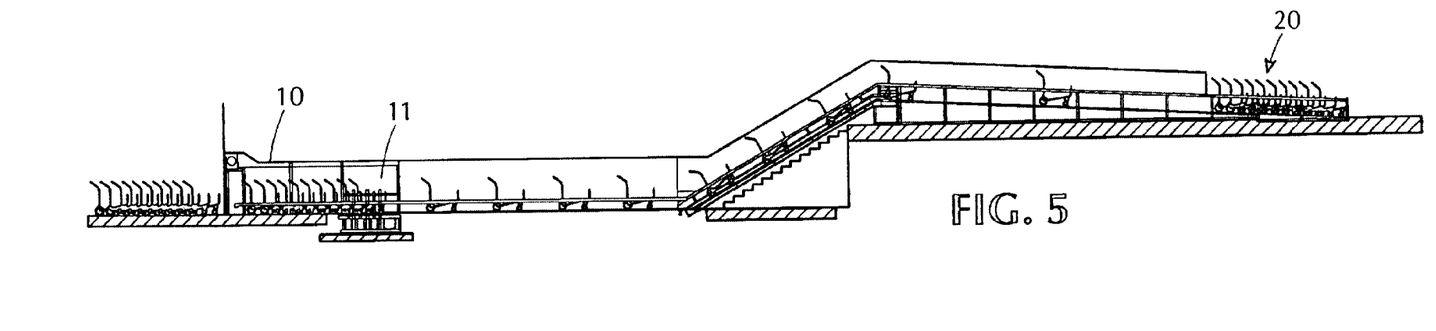
FIG. 5 is a side elevational view of a covered conveyor system of the type shown in FIG. 3 with a longer delivery path from the insertion module to the elevator.

In accordance with the invention, loose abandoned carts are gathered by terminal personnel and ganged into nested groups of approximately ten carts and are pushed into collecting stations 10 shown schematically in FIGS. 2, 3, and 5. The ganged loaded carts are spaced and separated in the cart separator 11 immediately adjacent to or otherwise integrated into the collecting station before they travel along a predetermined conveyorized path from the collecting station 10 remotely of the ultimate cart retrieval station 20, which may have one or more ranks 21, 22, et seq. of cart lanes. The fourth cart lane 24 shown in FIG. 2 may be a "bypass" lane which is part of a related integrated conveyor system going to another retrieval station (not shown) where the carts may also be stacked in one or more lanes for dispensing or redistribution to passengers.

In accordance with the principles of the present invention, the path of the cart conveyor between the collecting station 10 and the cart retrieval station 20 is established as a continuous cart railway track by a series of straight conveyor modules 14 and curved conveyor modules 15, assembled to form the entire empty cart return path. In FIG. 2, the curved return module is made up of a 90 degree section and a slightly less than 90 degree section to make a sweeping bend. However, a complete 180 degree bend in the conveyor cart path is contemplated and may be used, if necessary, in the practice of the present invention.

In accordance with the principle of the invention, each track module 14 or 15 has outer parallel tracks 16, 17 and an inner central track 18. As will be understood, the outer tracks 16 and 17 may engage and guide rear portions of the luggage cart to be conveyed while the center track 18 engages and guides center elements of the luggage cart. By way of illustration and not limitation, exemplary luggage carts 40 are schematically illustrated in FIG. 2 having a single central forward wheel 41 and two rear wheels 42.

As mentioned hereinabove, the rear wheels 42 may in some applications be lockable in known fashion or they may simply be freewheeling and the forward wheels 41 may be in the form of just one wheel as illustrated or as a pair of pivotable wheels on either side of the central longitudinal axis of the cart. The carts 40 are nestable one within the other in known fashion.

Some commercially available carts have a six-wheel configuration with a wheel pair at each end and a third pair in the center of the cart. The new system is also easily adaptable to the handling of carts of such six-wheel configuration.

Each of the track modules 14, 15 comprising the return path from the collecting station 10 and cart separator 11 to the retrieval station 20 has independent conveyor drive means of known construction to engage and move the carts 40 from the rearward end of each track module to the forward end of the track module and on to the next successive module. The conveyor drive may be an endless belt or chain centrally disposed to engage forward elements of the cart and move the cart along the associated track module or the conveyor may be in the form of a pair of spaced lateral belts or chains which engage elements of the cart at opposite sides thereof to move the cart along the associated modular section of track. The conveyor system may include associated rollers which engage the rear cart wheels, whether locked or unlocked, to permit movement of the cart along the track module from rear end to forward end. Movement of the carts along the entire path from module to module is indicated in the drawings by the directional arrows.

Figure 11:
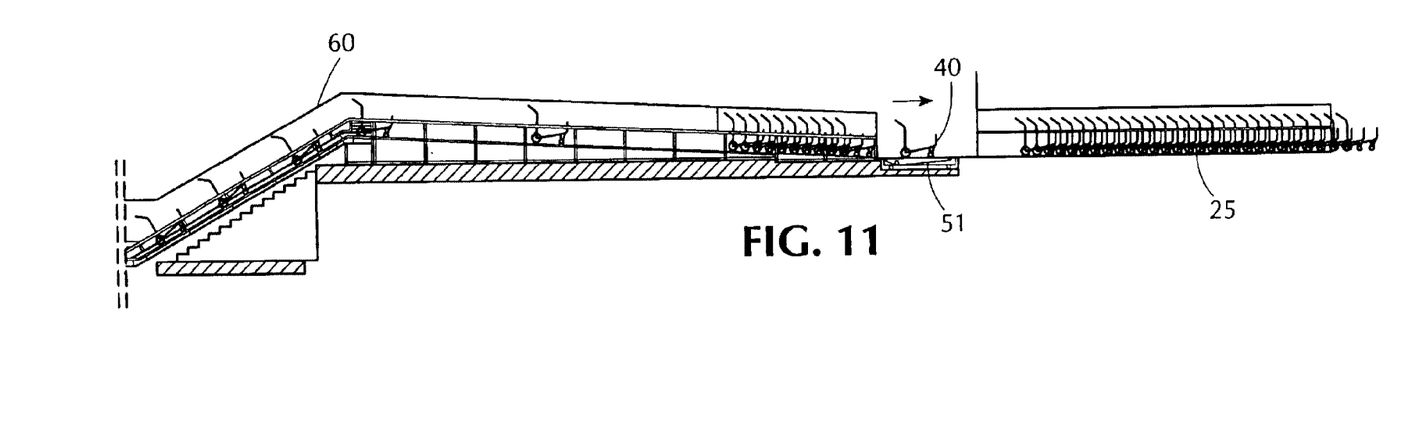
FIG. 11 is a covered conveyor system of the type shown in the preceding figures, but having a multi-lane depot at the end of the conveyor delivery path.
Figure 12:
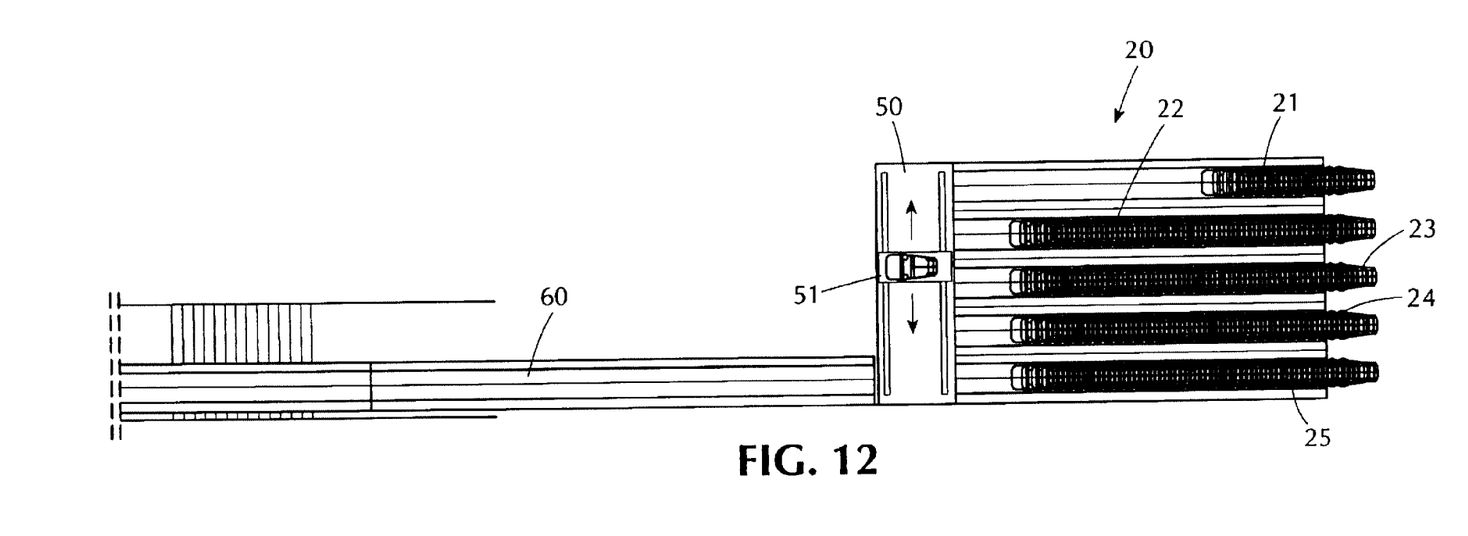
FIG. 12 is a top plan view of the covered conveyor delivery system of FIG. 11 having a multi-lane delivery system serviced by a reciprocating shuttle.

As an important aspect of the present invention, the conveyed carts are distributed in the retrieval station 20 into a series of parallel lanes 21, 22, 23, 24, 25 by a shuttle system 50 disposed perpendicularly to the conveyor path between the cart retrieval station 20 and the last track module. A shuttle 51 shown in FIG. 2 receives the forward most cart on the final conveyor track module prior to the retrieval station 20, engages that cart, and deposits it in one of the cart lanes 21, 22, 23, 24 (or 25 as shown in FIGS. 11 and 12). The shuttle unit 51 reciprocates laterally back and forth across the entry portion of each of the lanes 20–25 and has a suitable discharge mechanism (not shown) to deposit the cart into one of the lanes 21–25. The discharged cart then is moved by gravity or by straight-line conveyorized track modules similar to the module 14 so that the returned carts are nested and may be recovered by arriving passengers at the discharge ends of each of the lanes as indicated schematically in FIG. 2.

Figure 7:
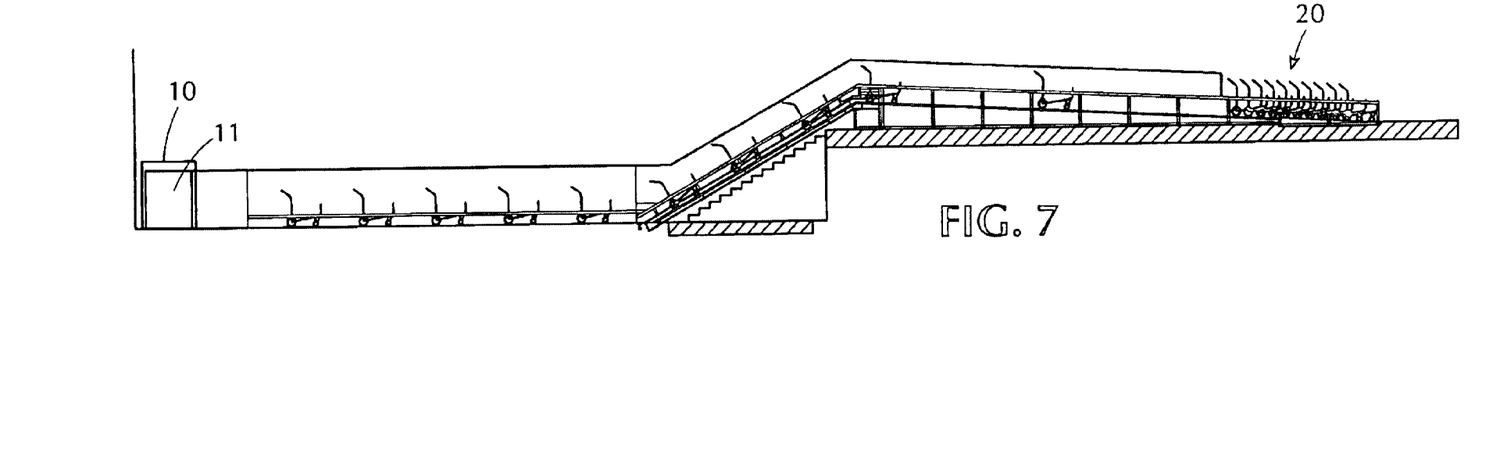
FIG. 7 is a covered conveyor system in which the cart insertion module is disposed at a right angle to the final delivery path of the conveyors.

To advantage, the collecting unit 10 receives and engages a ganged collection of carts and is associated with a separator unit 11 at its exit end which discharges them one by one at spaced intervals onto the conveyor path leading to the retrieval station. The spacing of the formerly ganged or nested carts is shown in FIGS. 3, 5, and 7. Importantly, the spacing accommodates the provision of small turning radii in the conveyor path as shown in FIG. 2. It will be understood that, were the carts to be transported in ganged relation, comparatively large radii would be required to traverse a non-linear path and such large turning radii are impractical and/or impracticable in most passenger terminal designs.

Figure 4:
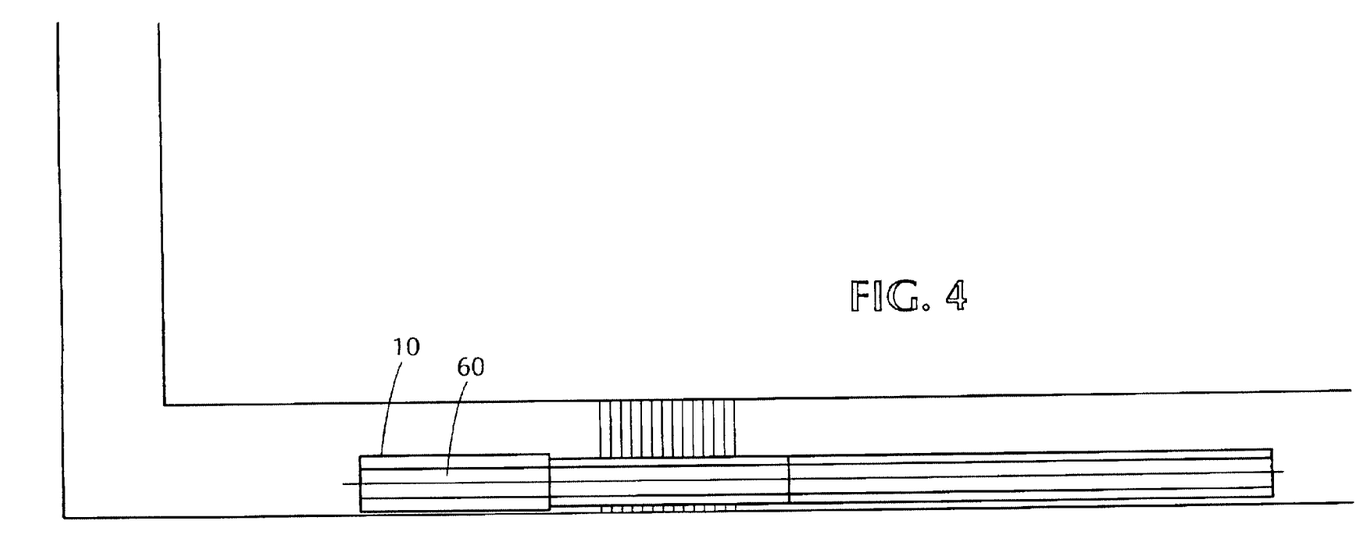
FIG. 4 is a plan view of the covered conveyor system of FIG. 3.
Figure 6:
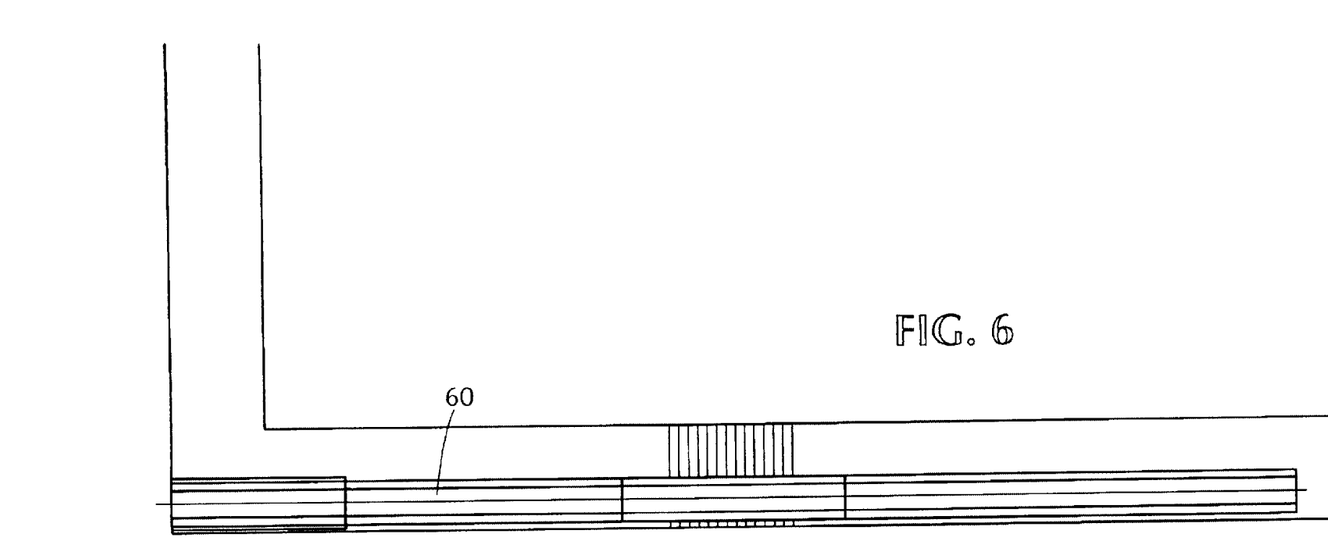
FIG. 6 is a top plan view of the covered conveyor of FIG. 5.
Figure 8:
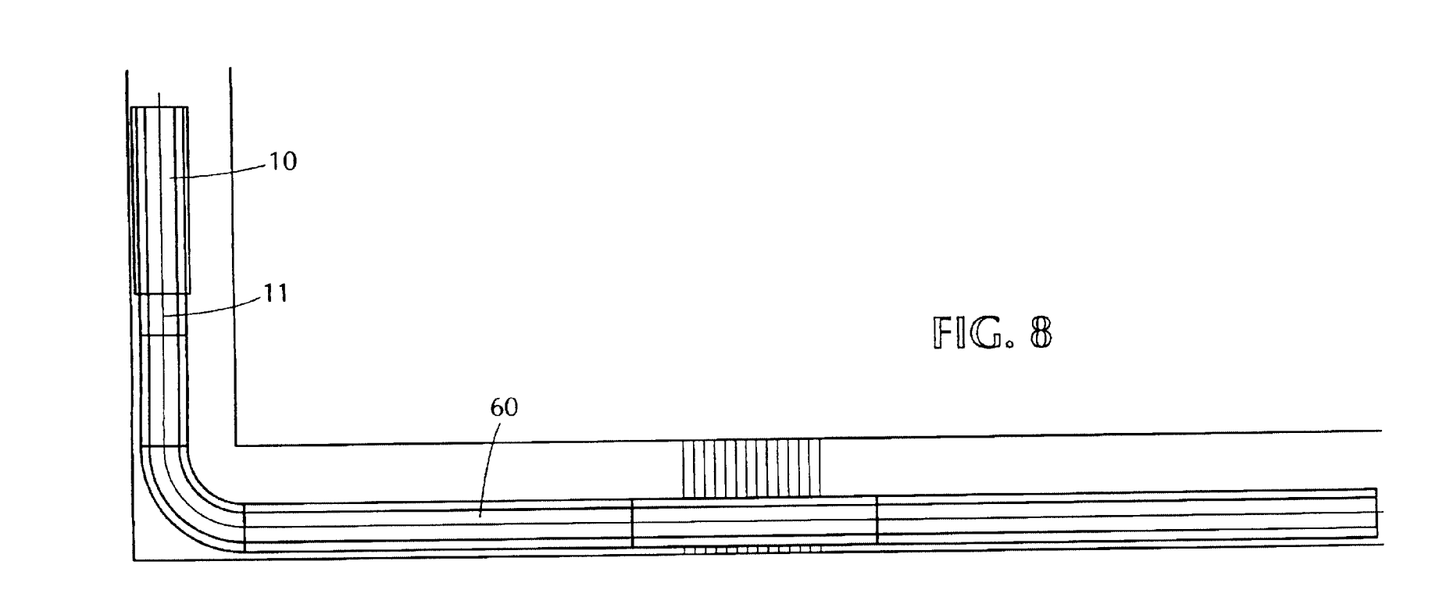
FIG. 8 is a top plan view of the covered conveyor system of FIG. 7.
Figure 9:
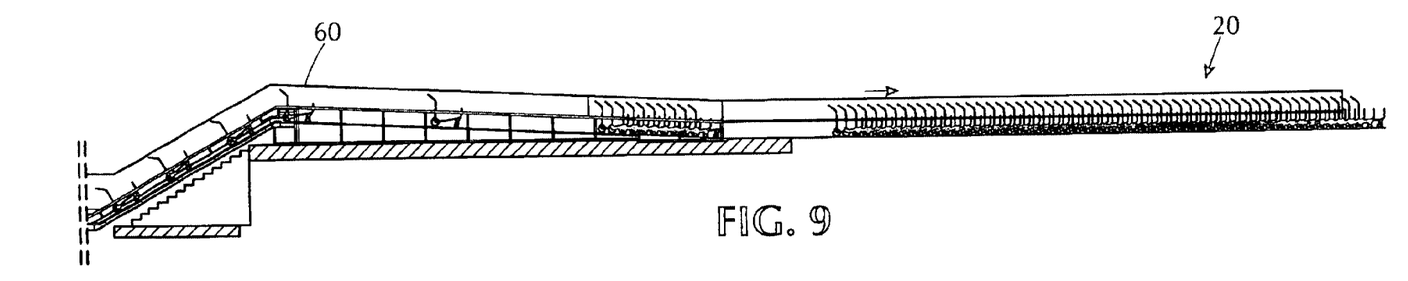
FIG. 9 is a covered conveyor system of the general type shown in FIG. 7, but having an extended final delivery path.
Figure 10:
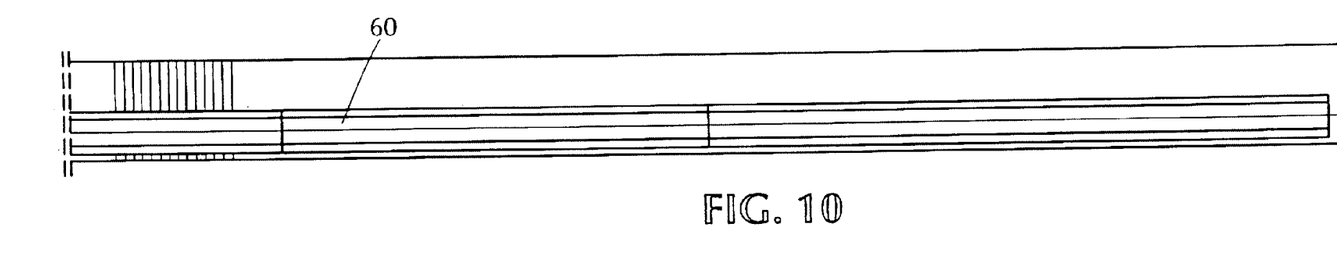
FIG. 10 is a top plan view of the covered conveyor system shown in FIG. 9.

FIGS. 3 and 4 illustrate an empty luggage cart return system in which the carts are delivered in an ascending inclined path as part of the return route and in which the final portion of the return route is a downward incline by which the carts may return to the retrieval station by gravity. FIGS. 5 and 6 show a similar arrangement where there is a greater straight-line travel between the collecting station 10 and the incline. FIGS. 7 and 8 show a return path turning 90 degrees from the collecting station 10 as the conveyed carts are returned to the retrieval station 20.

It is to be understood, of course, that by carefully selecting and combining the straight and curved track modules extending in a path from the collecting station 10 and utilizing either gravity or straight-line conveyor feeds for the final sections of the conveyor path, conveyorized return routes of almost any configuration can be developed and installed over very long distances. The use of protective coverings or housings 60, such as shown in FIGS. 3–12, enable the systems to be installed anywhere in an airport and to be protected from the elements and any possible contaminants.

It should be understood, of course, that the specific forms of the invention herein illustrated and described are intended to be representative only, as certain changes may be made therein without departing from the clear teachings of the disclosure. Accordingly, reference should be made to the following appended claims in determining the full scope of the invention.

I claim:

1. The method of returning empty luggage carts and the like from a remote location to a retrieval station, which comprises
    (a) manually collecting said empty carts at said remote location,
    (b) temporarily storing said carts in nested relation at a collecting station at said remote location,
    (c) engaging said nested carts in individually spaced apart relation by a cart conveyor means and transporting said spaced apart carts to said retrieval station, and
    (d) storing said carts in nested relation at said retrieval station.

2. The method of claim 1, wherein,
    (a) at said retrieval station said carts are transported laterally with respect to said cart conveyor means and selectively placed in one of a plurality of laterally spaced apart storage lanes.

3. An empty cart return system for use in transporting empty luggage carts to a retrieval station at a transportation terminal, which comprises
    (a) a collecting station for receiving and temporarily storing a plurality of empty luggage carts in nested relation,
    (b) a return conveyor track system comprising a plurality conveyor sections extending from said collecting station to a retrieval station located remotely of the collecting station,
    (c) means for selectively engaging empty carts at the collecting station and engaging them with said return conveyor track system for transportation thereby in spaced apart relation to said retrieval station,
    (d) said conveyor sections including one or more sections extending in a direction different than an adjacent conveyor section,
    (e) said return conveyor track system having a discharge end,
    (f) a cart retrieval section for receiving carts from said discharge end and storing them for later use,
    (g) a shuttle carrier positioned at said discharge end and movable laterally relative to said discharge end,
    (h) said shuttle carrier being adapted to receive a cart delivered to said discharge end and being movable laterally with said cart, and
    (i) said retrieval station comprising a plurality of storage track sections positioned in laterally spaced relation to said discharge end and arranged for selective alignment with said shuttle carrier for receiving a cart therefrom.

4. An empty cart return system for use in transporting empty luggage carts to a retrieval station at a transportation terminal, which comprises
    (a) a collecting station for receiving and temporarily storing a plurality of empty luggage carts in nested relation,
    (b) a return conveyor track system comprising a plurality conveyor sections extending from said collecting station to a retrieval station located remotely of the collecting station,
    (c) means for selectively engaging empty carts at the collecting station and engaging them with said return conveyor track system for transportation thereby in spaced apart relation to said retrieval station,
    (d) said conveyor sections including one or more sections extending in a direction different than an adjacent conveyor section,
    (e) said return conveyor track system having a discharge end,
    (f) a cart retrieval section for receiving carts from said discharge end and storing them for later use,
    (g) said collecting and retrieval stations storing said carts in nested relation, and
    (h) said carts being transported in separated relation between said stations.

* * * * *